US006928816B2

(12) United States Patent  
Leavesley

(10) Patent No.: US 6,928,816 B2
(45) Date of Patent: Aug. 16, 2005

(54) TURBOCHARGER APPARATUS

(76) Inventor: Malcolm George Leavesley, 54 Heylyn Square, Malmesbury Road, Bow, London E3 2DW (GB)

( * ) Notice: Subject to any disclaimer, the term of this patent is extended or adjusted under 35 U.S.C. 154(b) by 0 days.

(21) Appl. No.: 10/488,364

(22) PCT Filed: Sep. 6, 2002

(86) PCT No.: PCT/GB02/04094

§ 371 (c)(1),
(2), (4) Date: Mar. 2, 2004

(87) PCT Pub. No.: WO03/023194

PCT Pub. Date: Mar. 20, 2003

(65) Prior Publication Data

US 2004/0244372 A1 Dec. 9, 2004

(30) Foreign Application Priority Data

Sep. 10, 2001 (GB) .............................. 0121864

(51) Int. Cl.$^7$ .......................... F01D 17/14; F01B 25/02; F02C 6/12; F02D 23/00
(52) U.S. Cl. .......................... 60/602; 415/158; 417/407
(58) Field of Search .......................... 60/602; 415/157, 415/158, 160, 165, 166; 417/407

(56) References Cited

U.S. PATENT DOCUMENTS

| 5,214,920 A | | 6/1993 | Leavesley ................ 60/602 |
| 5,441,383 A | * | 8/1995 | Dale et al. ................ 415/158 |
| 6,536,214 B2 | * | 3/2003 | Finger et al. ................ 60/602 |
| 6,694,733 B1 | * | 2/2004 | Bernardini et al. .......... 60/602 |
| 2004/0025504 A1 | * | 2/2004 | Perrin et al. ................ 60/602 |

FOREIGN PATENT DOCUMENTS

| DE | 42 18 229 C | | 3/1993 | ........... F01D/21/10 |
| DE | 4218229 C1 | * | 3/1993 | ........... F01D/17/16 |
| EP | 0 034 915 A | | 9/1981 | ................ 415/158 |
| EP | 0 571 205 A | | 11/1993 | ................ 415/158 |
| EP | 0 884 453 A | | 12/1998 | ........... F01D/17/14 |
| FR | WO02/44527 A1 | * | 6/2002 | ........... F01D/17/14 |

* cited by examiner

Primary Examiner—Sheldon J Richter
(74) Attorney, Agent, or Firm—Iandiorio & Teska

(57) ABSTRACT

A variable turbocharger apparatus includes a housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds the turbine and which receives the exhaust gases from the second inlet before the exhaust gases are conducted to the turbine, and a bearing assembly for permitting the rotation of the turbine. Fixed vanes are mounted in the chamber which are for accurately directing exhaust gases on to the turbine. A piston is slidable and is positioned between the vanes and the turbine. Control means is connected to the piston and is for controlling the sliding movement of the piston, the piston having an end which is nearest the bearing assembly and which defines a gap, the size of the gap being variable in dependence upon the sliding of the piston under the control of the control means, the size of the gap being effective to control the amount of the exhaust gases that act on the turbine thereby controlling the speed of rotation of the turbine and thereby the amount of air conducted by the compressor through the outlet to the engine. The end of the piston is such that it has a flange which extends radially outwardly and which is provided with slots for receiving the vanes.

24 Claims, 14 Drawing Sheets

TURBOCHARGER APPARATUS

FIELD OF THE INVENTION

This invention relates to turbocharger apparatus and, more especially, this invention relates to variable turbocharger apparatus.

BACKGROUND OF THE INVENTION

Variable turbocharger apparatus is known comprising a housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which extends around the turbine and which receives the exhaust gases from the second inlet before the exhaust gases are conducted to the turbine, a bearing assembly for permitting the rotation of the turbine, and a heat shield for shielding the bearing assembly from the exhaust gases. This known type of variable turbocharger apparatus may require the use of a non-standard bearing assembly, which increases manufacturing costs. Also, gas leakage can be a problem.

It is an aim of the present invention to obviate or reduce the above mentioned problems.

SUMMARY OF THE INVENTION

Accordingly, the present invention provides variable turbocharger apparatus comprising a housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds the turbine and which receives the exhaust gases from the second inlet before the exhaust gases are conducted to the turbine, and a bearing assembly for permitting the rotation of the turbine, the variable turbocharger apparatus comprising fixed vanes which are mounted in the chamber and which are for accurately directing exhaust gases on to the turbine, a piston which is slidable and which is positioned between the vanes and the turbine, and control means which is connected to the piston and which is for controlling the sliding movement of the piston, the piston having an end which is nearest the bearing assembly and which defines a gap, the size of the gap being variable in dependence upon the sliding of the piston under the control of the control means, the size of the gap being effective to control the amount of the exhaust gases that act on the turbine thereby controlling the speed of rotation of the turbine and thereby the amount of air conducted by the compressor through the outlet to the engine, and the end of the piston being such that it has a flange which extends radially outwardly and which is provided with slots for receiving the vanes.

The variable turbocharger apparatus of the present invention is able to use a standard bearing assembly, and it is also able to substantially eliminate gas leakage in the region of the vanes.

The flange on the end of the piston forms a control ring that operates over the vanes. By using the flange, the exhaust gases are guided more accurately through the vanes onto the turbine. Thus the flange enables the performance of the variable turbocharger apparatus to be enhanced. Pressure on the back face of the flange helps to keep the piston in a closed position, so that a smaller sized control means may be used. Gas leakage through the slots where the vanes are located is not a problem with the variable turbocharger apparatus of the present invention because gas pressure is the same both sides of the flange. During use of the variable turbocharger apparatus, if a carbon deposit builds up on the vanes, then this is cleaned off as the flange of the piston moves backwards and forwards over the vanes. Gas leakage is prevented when the piston is in its closed position. When the piston is in its closed position, this is the most vulnerable time for gas leakage. However, with the variable turbocharger apparatus of the present invention, all the gases are guided accurately through the vanes, the heat shield and the flange as required.

The variable turbocharger apparatus may include a heat shield for shielding the bearing assembly from heat from the exhaust gases. The heat shield may be a ring-shaped heat shield. Alternatively, the heat shield may be a disc shaped heat shield having an outer ring portion, an inner wall portion, and an aperture through the inner wall portion.

The fixed vanes may be mounted on the heat shield.

The variable turbocharger apparatus of the present invention may include an insert located in the housing, and may be one in which the vanes are mounted on the insert.

The insert may be a removable insert which is removable from the housing, the removable insert being such that it facilitates assembly of the variable turbocharger apparatus.

The removable insert may be held in position by a spring. The spring may be such that it forms a seal for preventing gas leakage from the chamber which surrounds the turbine. The spring may be advantageous for manufacture and assembly of the variable turbocharger apparatus in that it reduces tolerance requirements.

If desired, the insert may be a non-removable insert which is not removable from the housing.

The variable turbocharger apparatus may be one in which the piston passes through a bore in the insert.

The variable turbocharger apparatus may be one in which the fixed vanes are mounted on a part of the housing which is adjacent the bearing assembly and which defines an exit from a chamber.

Advantageously, the piston has a first abutment for forming a seal against a mating surface thereby to prevent loss of the exhaust gases between the abutment and the mating surface. The mating surface may be a mating surface on a part of the housing. Alternatively, the mating surface may be a mating surface on an insert in a part of a housing.

The variable turbocharger apparatus may be one in which the piston has a second abutment for engaging against the end of the vanes, thereby setting the gap when the piston is in its closed position.

The variable turbocharger apparatus may include a sealing ring for forming an auxiliary seal for preventing loss of any of the exhaust gases that pass between the first abutment and the mating surface.

The control means may include a fork member which is connected to the piston on two opposed sides. Alternatively, the control means may include a U-shaped member which is connected to the piston on a face of the piston.

The variable turbocharger apparatus may be one in which the slots are open slots which extend inwardly from a periphery of the flange, or closed slots in the flange.

The control means will be an electronic control means which operates as part of an engine management control system. The control system may also use an air or oil operated actuator control means in conjunction with the engine management system.

The variable turbocharger may be one in which the chamber is a volute. Various types of chamber may be employed, for example of various cross sectional shapes.

BRIEF DESCRIPTION OF THE DRAWINGS

Embodiments of the invention will now be described solely by way of example and with reference to the accompanying drawings in which.

DETAILED DESCRIPTION OF THE DRAWINGS

Figure 1:
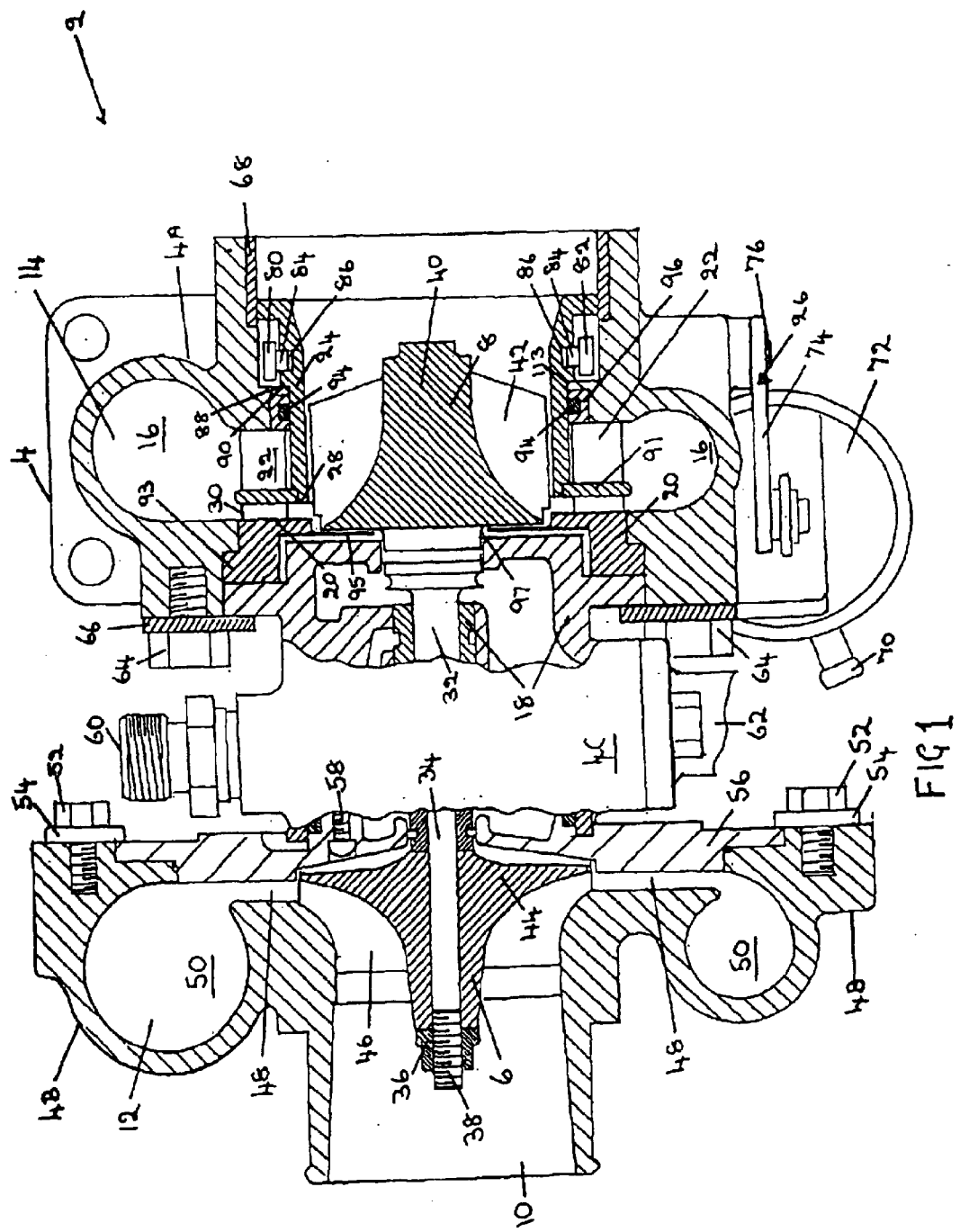
FIG. 1 is a section through first variable turbocharger apparatus with a piston in a closed position.

Referring to FIG. 1, there is shown variable turbocharger apparatus 2 comprising a housing 4 a compressor 6 mounted for rotation in the housing 4, and a turbine 8 which is also mounted for rotation in the housing 4. The variable turbocharger apparatus 2 also comprises a first inlet 10 for enabling air to be conducted to the compressor 6, and an outlet 12 for enabling air from the compressor 6 to be conducted to an engine (not shown).

The variable turbocharger apparatus 2 has a second inlet 14 for enabling exhaust gases from the engine to be conducted to the turbine 8 in order to rotate the turbine 8. A chamber 16 extends around the turbine 8 and receives the exhaust gases from the second inlet 14 before the exhaust gases are conducted to the turbine 8.

A bearing assembly 18 permits the rotation of the turbine 8. A heat shield 20 is provided for shielding the bearing assembly 18 from heat from the exhaust gases.

The variable turbocharger apparatus 2 comprises fixed vanes 22 which are mounted in the chamber 16 and which are for accurately directing the exhaust gases on to the turbine 8. A piston 24 is positioned between the fixed vanes 22 and the turbine. The piston 24 is a slideable piston. Control means 26 control the sliding movement of the piston 24.

The piston 24 has an end 28 which is adjacent the heat shield 20. This end 28 is spaced apart from the heat shield by a gap 30. FIG. 1 shows the piston 24 in a closed position in which the gap 30 is at its smallest condition. The size of the gap 30 is variable in dependence upon the sliding of the piston 24. The sliding of the piston 24 is under the general control of the control means 26. The size of the gap 30 is effective to control the amount of the exhaust gases that acts on the turbine 8, thereby accurately controlling the speed of rotation of the turbine 8 and thereby the amount of air conducted by the compressor through the outlet 12 to the engine.

As shown in FIG. 1, the variable turbocharger apparatus 2 also comprises a shaft 32 on which the turbine 8 and the compressor 6 are mounted. The compressor 6 is secured to a reduced diameter end portion 34 of the shaft 32 by a nut 36 which screws on to a screw threaded portion 38 on the end portion 34 of the shaft 32.

The turbine 8 has a central body portion 40 and vanes 42. The compressor 6 has a central body portion 44 and vanes 46.

Compressed air from the compressor 6 passes along a diffuser passage 48 into a chamber 50 in the form of a volute as shown. The chamber 16 feeding the exhaust gases to the turbine 8 is also in the form of a volute as shown.

Bolts 52 bearing on washers 54 secure a back plate 56 to a part of the housing 4 that is for the compressor 6. Bolts 58 go Into the bearing assembly 18 to hold the back plate 56 in position.

The bearing assembly 18 has an oil intake 60 for providing oil for the bearing assembly 18. Also provided is an oil drain 62.

Bolts 64 act on a clamping plate 66 to clamp the bearing assembly 18 to the part of the housing 4 that is for the turbine 8.

The piston 24 slides against an insert 68 as shown. The insert can be made of a corrosion resistance material depending upon the material used for the housing 4. The housing 4 can basically be regarded as being a three part housing comprising a turbine housing 4A, a compressor housing 4B, and a bearing housing 4C.

The control means 26 has an air intake 70 for controlling an actuator member 72. A diaphragm (not shown) in the actuator member 72 is acted upon by the air. The air intake is controlled by an electronic control device (not shown).

Figure 6:
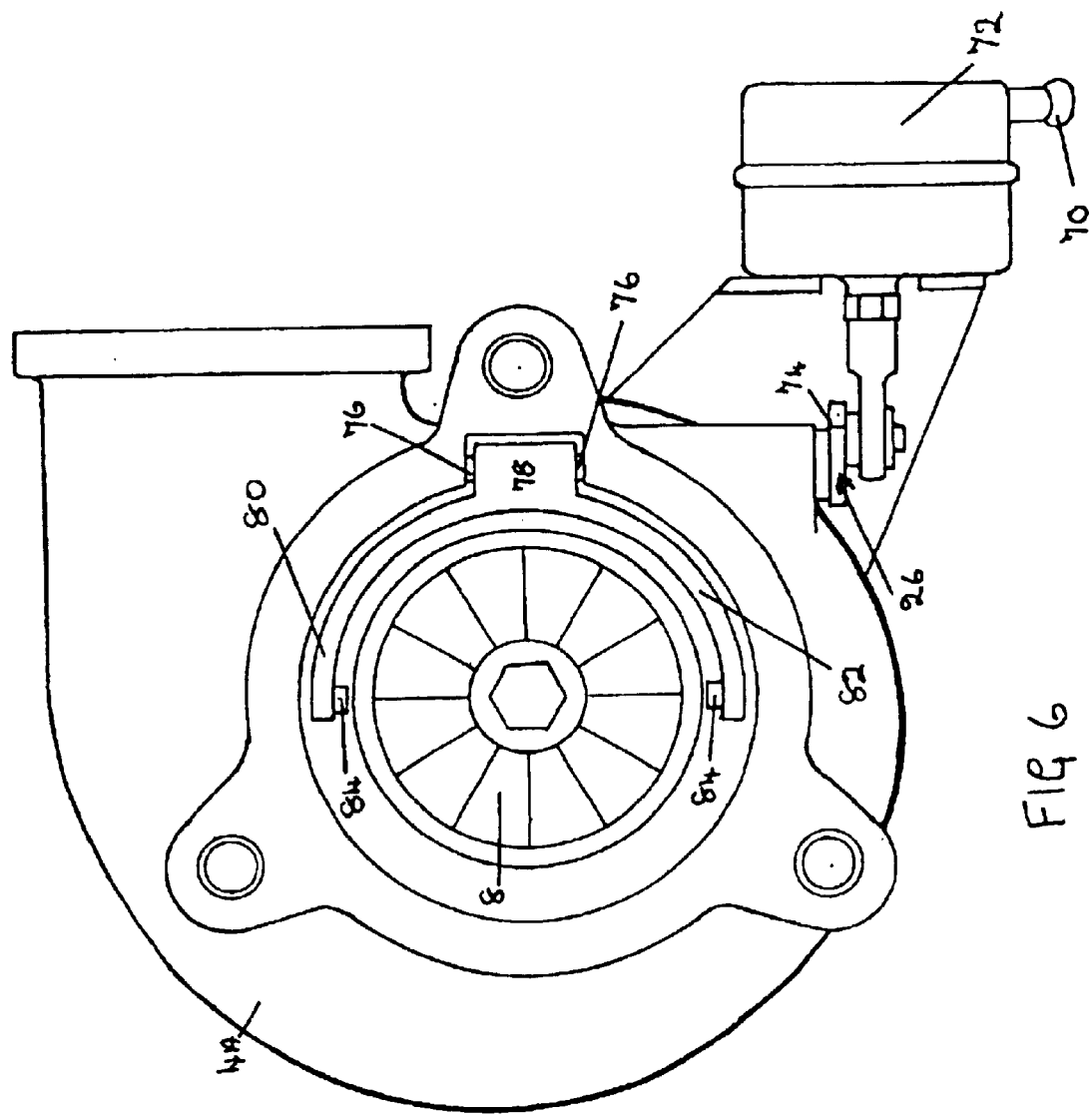
FIG. 6 is a side view of the first turbocharger apparatus shown in FIG. 1 and illustrates control means having a fork member which is connected to the piston on two opposed sides of the piston.

Movement of the diaphragm causes movement of an arm 74. The arm 74 pivots a rod 76 (see FIG. 6). The rod 76 as best shown in FIG. 6 is connected to a fork device 78 having a pair of arms 80, 82 each arm 80, 82 has a locator member 84. Each locator member 84 locates in a recess 86 as shown in FIG. 1.

As can be seen from FIG. 1, the fixed vanes 22 are mounted on the heat shield 20. In an alternative embodiment of the invention, the fixed vanes 22 may be mounted on a part of the housing 4 which is opposite the heat shield 20 and which defines an exit from the chamber 16.

The piston 24 has an abutment 88 for forming a seal against a mating surface 90, thereby to prevent loss of the exhaust gases between the abutment 88 and the mating surface 90. As shown in FIG. 1, the mating surface 90 is formed as a part of the housing 4.

The provision of the abutment 88 and the mating surface 90 may be sufficient to prevent the loss of the exhaust gases between the abutment 88 and the mating surface 90. As an extra precaution against the loss of the exhaust gases, a seal 94 is provided. In FIG. 1, the seal 94 is provided in an insert 96 in a part of the housing 4. The seal 94 is in the form of a sealing ring and it thus acts to form an auxiliary seal for preventing loss of any of the exhaust gases that might pass between the abutment 88 and the mating surface 90.

The end 28 of the piston 24 has a flange 91. The flange 91 extends radially outwardly as shown. The flange 91 is provided with slots (not shown in FIG. 1) for receiving the vanes 22.

The heat shield 20 shown in FIG. 1 is a disk shaped heat shield having an outer ring portion 93 and an inner wall portion 95. The inner wall portion 95 has a aperture 97 through which the turbine 8 passes.

Figure 2:
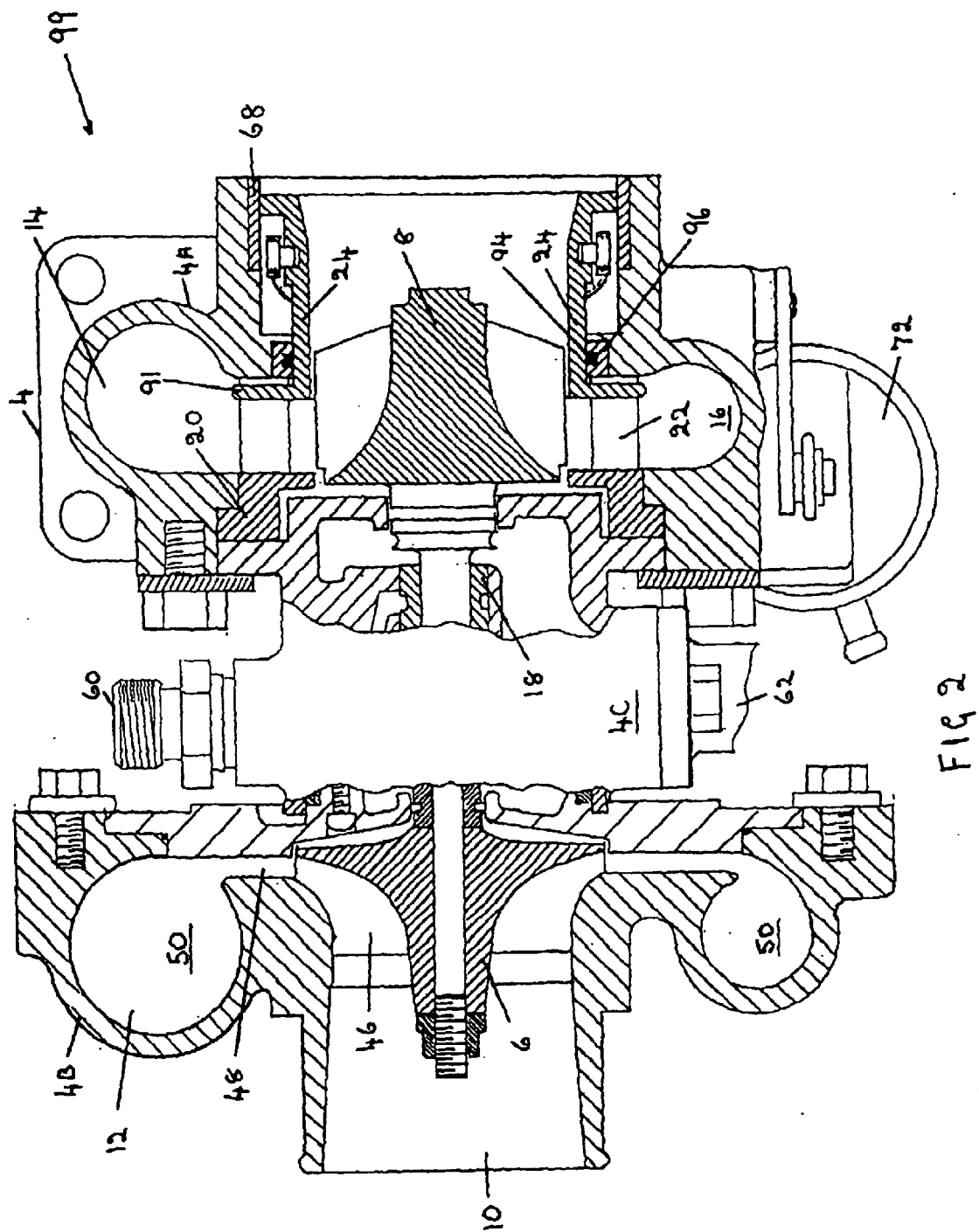
FIG. 2 is a section like FIG. 1 but through second variable turbocharger apparatus and with a piston in a fully open position.

FIG. 2 is a section through second variable turbocharger apparatus 99. The second variable turbocharger apparatus 99 is similar to the variable turbocharger apparatus 2 shown in FIG. 1 and similar parts have been given the same reference numerals for ease of comparison and understanding. In FIG. 2, it will be seen that the heat shield 20 does not have the inner wall portion 95. In FIG. 2 it will also be seen that the piston 24 is shown in its open position, rather than in its closed position as shown in FIG. 1.

Figure 3:
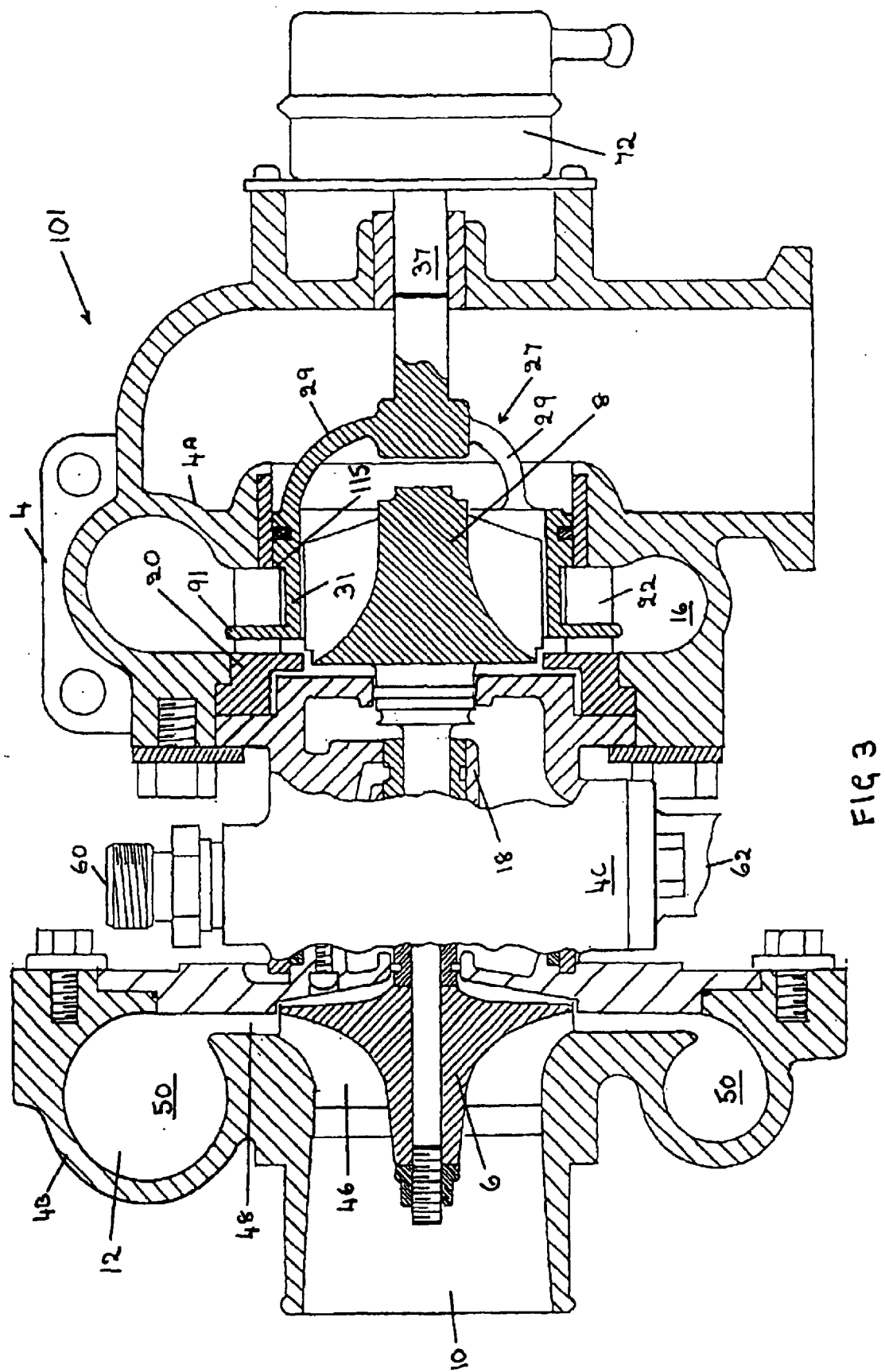
FIG. 3 is a section like FIG. 1 but through third variable turbocharger apparatus and with a piston in a closed position.
Figure 4:
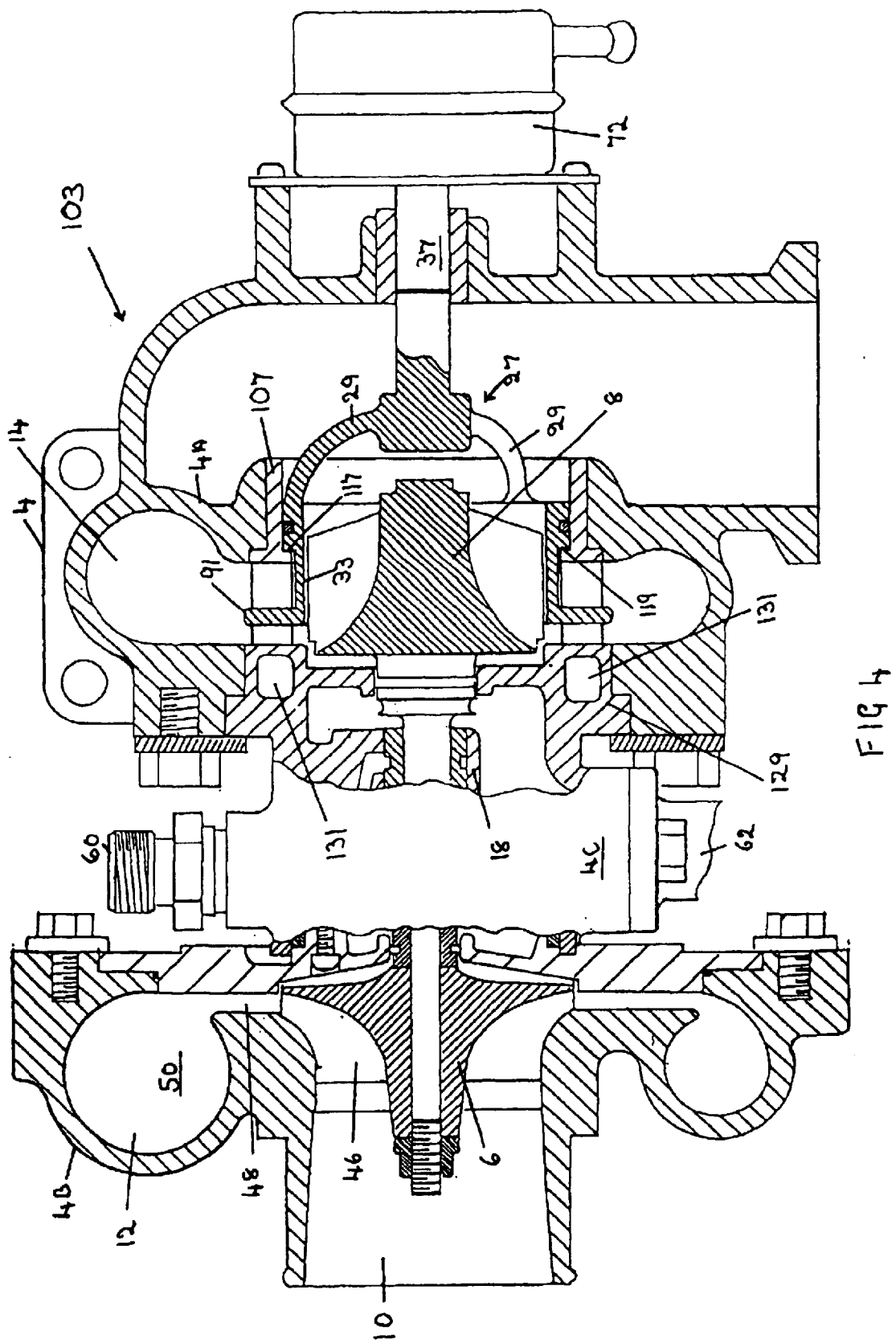
FIG. 4 is a section like FIG. 1 but through fourth variable turbocharger apparatus and with a piston in a closed position.
Figure 5:
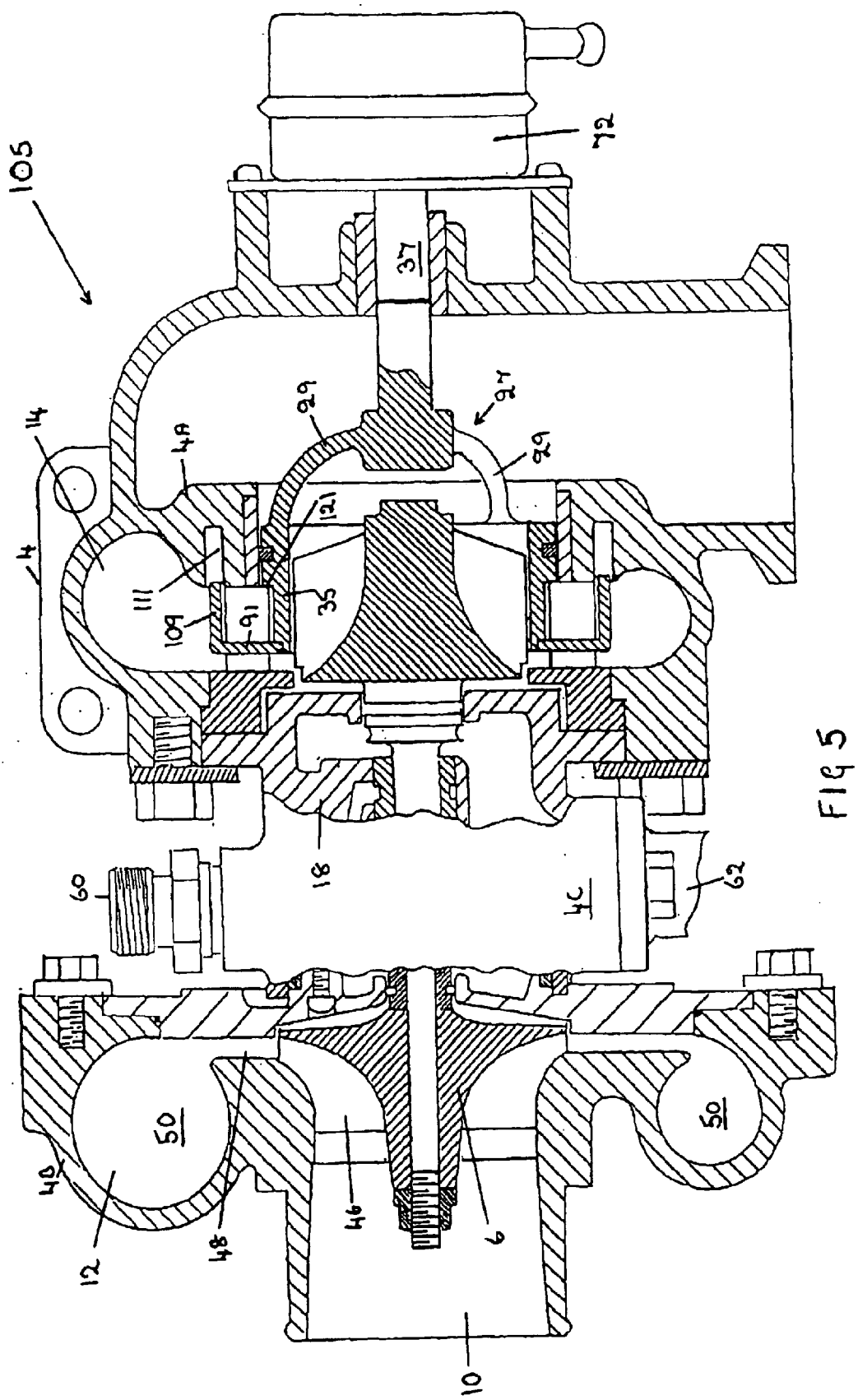
FIG. 5 is a section like FIG. 1 but through fifth variable turbocharger apparatus and with a piston in a closed position.

FIG. 3 shows third variable turbocharger apparatus 101. FIG. 4 shows fourth variable turbocharger apparatus 103. FIG. 5 shows fifth variable turbocharger apparatus 105. The variable turbocharger apparatus 101 shown in FIG. 3, 103 shown in FIGS. 4 and 105 shown in FIG. 5 is similar to the variable turbocharger apparatus 2 shown in FIGS. 1 and 99 shown in FIG. 2. Similar parts have again been given the same reference numerals for ease of comparison and understanding.

In FIG. 3 the variable turbocharger apparatus 101 is operated by control means 27 which is similar to the control means 26. The control means 27 is shaped as shown in FIGS. 3, 4 and 5 and it connects by three arms 29 to a piston 31 as shown in FIG. 3, or to a piston 33 as shown in FIG. 4, or to a piston 35 as shown in FIG. 5. The arms 29 connect to a shaft 37 which connects to the actuator member 72.

In FIG. 3, the vanes 22 are cast as part of the heat shield 20. In FIG. 4, the vanes 22 are case onto an insert 107. The piston 33 works against the insert 107 as shown in FIG. 4.

In FIG. 5, the flange 91 is provided with a return portion 109 which is received in a groove 111 as shown.

In FIG. 1, the flange 91 is shown in the closed position, with the piston 24 having been moved by the control means 26. The travel of the piston 24 towards its closed position is arrested by a stop portion 113 on the piston 24. FIG. 2 shows the piston 24 in the open position. FIG. 3 shows the piston 31 in the closed position with the closing movement of the piston 31 having been stopped when a stop portion 115 of the piston 31 engages the ends of the vanes 22. In FIG. 4, a stop portion 117 on the piston 33 engages a flange 119 on the insert 107 in order to stop the inward travel of the piston 33. In FIG. 5, a stop portion 121 engages the ends of the vanes 22 in order to stop the inward travel of the piston 35. FIG. 4 also shows a design with no heat shield, and with the vanes cast on the insert 107. In order to keep the bearing assembly cool, a water jacket 129 is provided with a water passageway 131.

FIG. 6 is an end view of the turbocharger apparatus 2 shown in FIG. 1 and illustrates in more detail the location of the actuator member 72.

Figure 8:
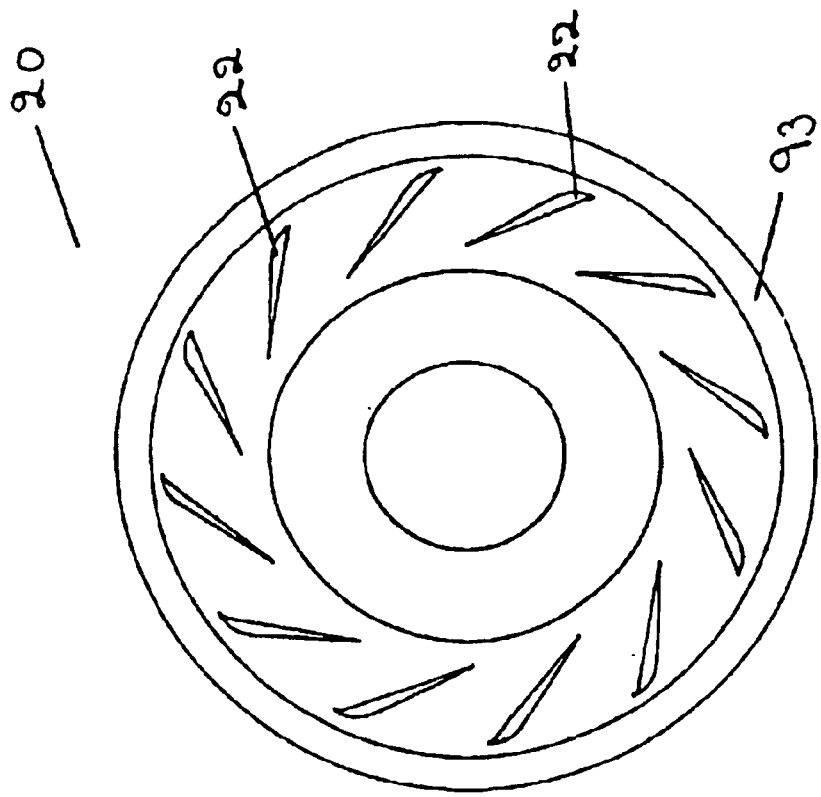
FIG. 8 is an end view of the heat shield shown in FIG. 7.
Figure 7:
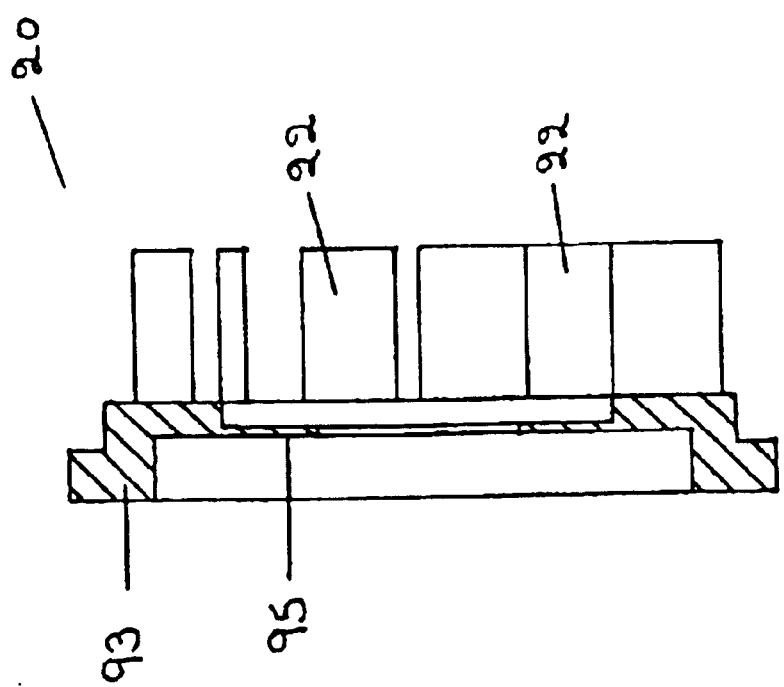
FIG. 7 is a section through the heat shield shown in the first variable turbocharger apparatus of FIG. 1.

FIGS. 7 and 8 show the heat shield 20. The heat shield 20 has fixed vanes 22. The heat shield 20 also has an outer ring portion 93 which is similar in shape to the heat shield 20 shown in FIG. 2. However the heat shield 20 also has the inner wall portion 95 which provides additional heat shielding facilities for the bearing assembly 18.

Figure 9:
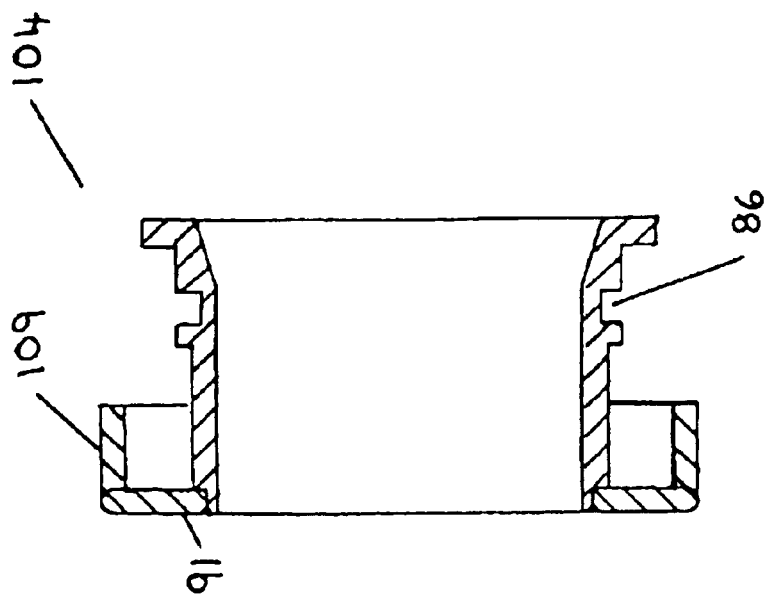
FIG. 9 is the section through a piston which is like the piston shown in FIG. 5 but which is for use with control means of the type shown in FIGS. 1, 2 and 6.
Figure 10:
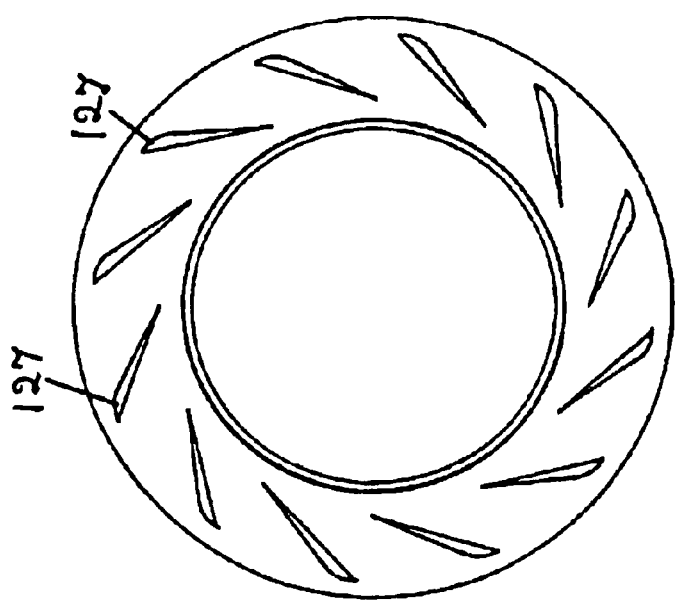
FIG. 10 is an end view of a flange part of the piston shown in FIG. 9, the flange having slots for vanes.

FIGS. 9 and 10 show a piston 104 which is like the piston 35 shown in FIG. 5 but which uses the control means 26 shown in FIG. 1. Although not shown in FIG. 9, the piston 104 may be provided with a pin to stop rotation of the piston 104 during use of the variable turbocharger apparatus. FIG. 9 also shows the piston 104 provided with a groove 86 to connect to the fork device 78 shown in FIG. 6. FIG. 10 is a end view of the piston flange, and shows the slots for the vanes.

Figure 13:
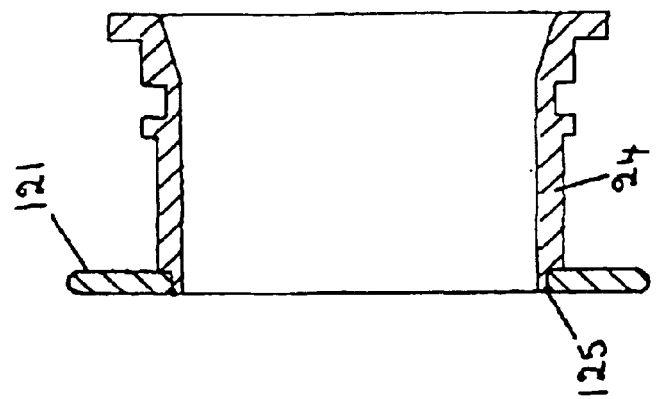
FIG. 13 is a side view of the piston shown in FIGS. 1 and 2, and illustrates how the control ring shown in FIGS. 11 and 12 may be fitted to the piston.
Figure 12:
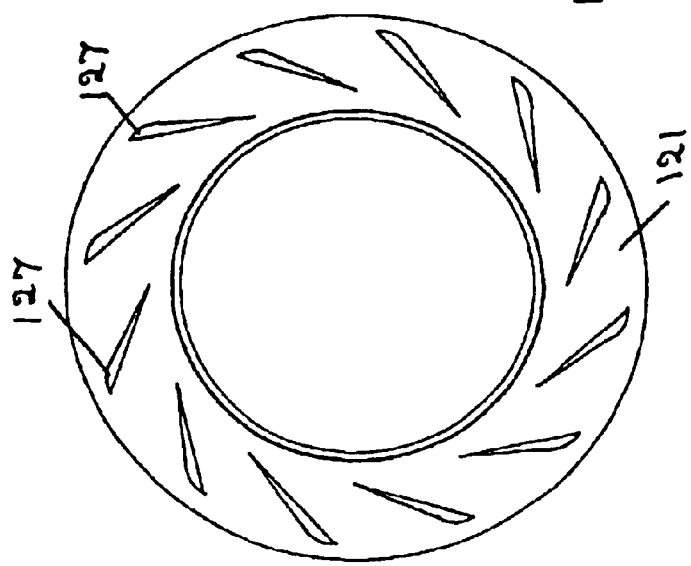
FIG. 12 is an end view of a control ring where the slots are completely within the control ring.
Figure 11:
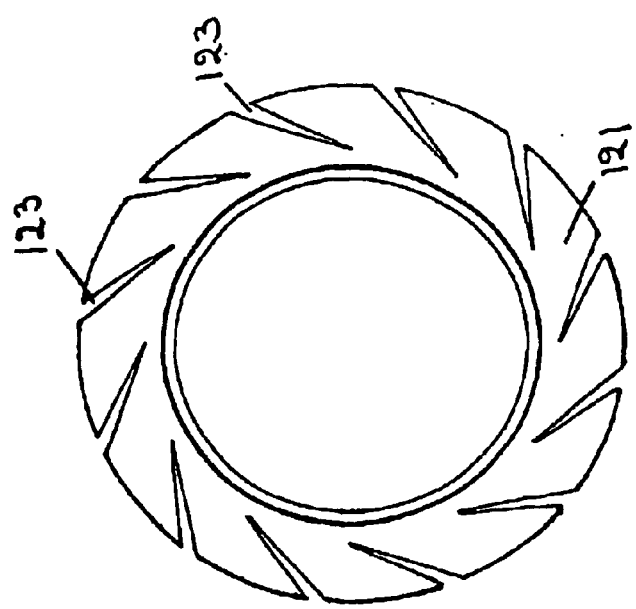
FIG. 11 is an end view of a control ring fixed to the end of a piston, the control ring having slots extending inwardly from a periphery of the control ring.

FIG. 11 shows a design for a piston flange 121. Slots 123 are cut into the flange 121 from the outer periphery of the flange 121 as shown. This design may be an economically way to produce the flange 121. The flange 121 and be formed as a separate ring which can secured to the remainder of the piston 24 by a weld 125 as shown in FIG. 13. Alternatively, the weld 125 can be a peen or a screw. FIG. 12 shows how slots 127 may alternatively be completely formed in the flange 121. Again the flange 121 shown in FIG. 12 may be formed as a separate ring for attachment to the remainder of the piston 24 as shown in FIG. 13.

Figure 14:
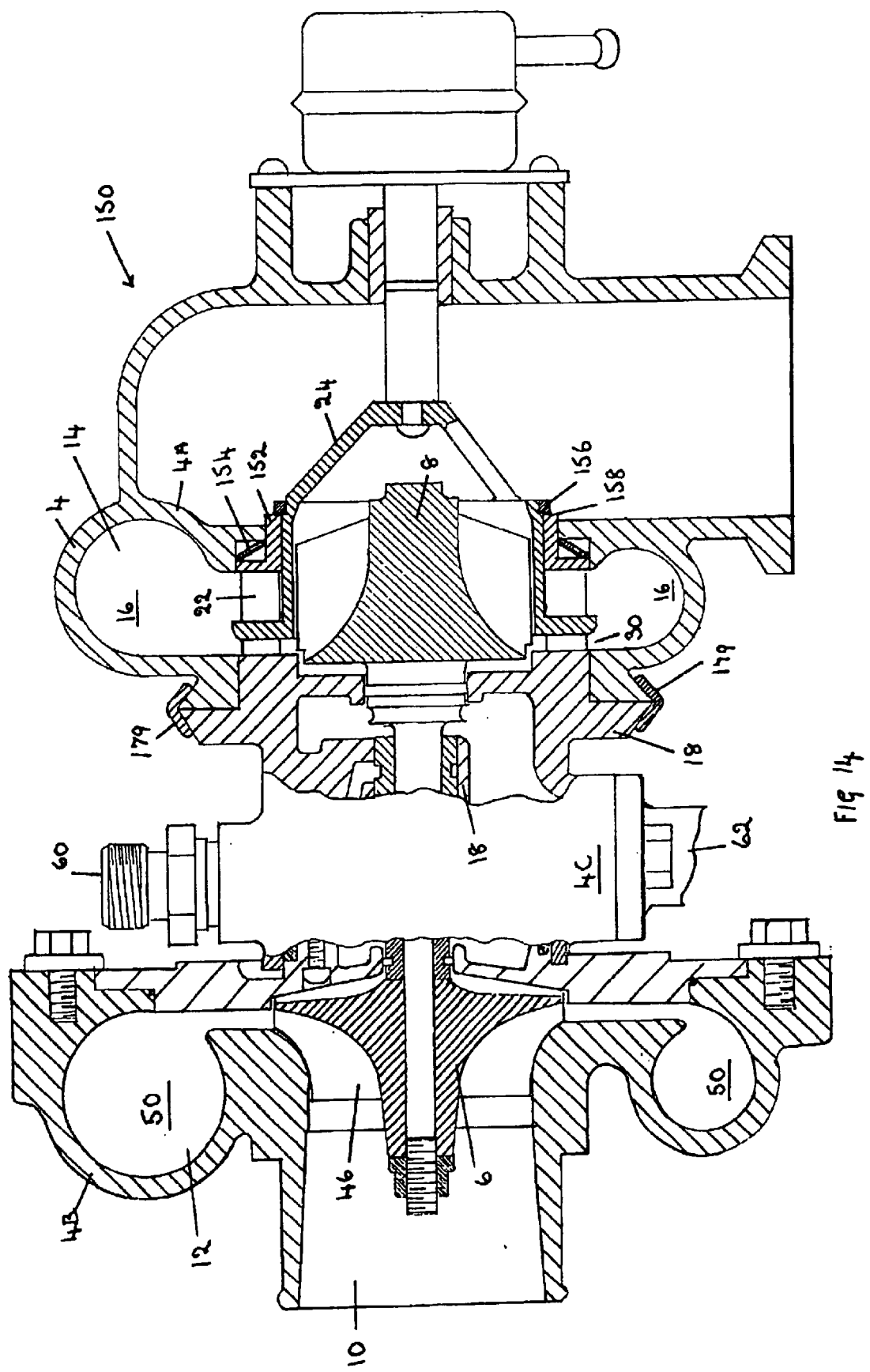
FIG. 14 is a section through sixth variable turbocharger apparatus of the present invention.

Referring now to FIGS. 14–18, similar parts as in previous Figures have been given the same reference numerals for ease of comparison and understanding. In FIG. 14, there is shown variable turbocharger apparatus 150 having an insert 152 on which the fixed vanes 22 are mounted. The insert 152 is removable from the turbine housing 4. A disc spring 154 is used to push the insert 152 to the left as shown in FIG. 14 and over and against the bearing assembly 18. The disc spring 154 is also used as a seal for preventing gas leakage.

As also shown in FIG. 14, an abutment in the form of a stop ring 156 is employed to set the start gap 30 over the turbine wheel. The stop ring 156 abuts against a small lip 158 on the piston 24. The stop ring 156 may be spot welded, crimped or otherwise held in position. When the stop ring 156 is set against the lip 158, the stop ring 156 may then prevent all of the gas leakage from passing through the piston 24 when the piston 24 is in the closed position and thus when the piston 24 is pushed against the insert 152.

The variable turbocharger 150 shown in FIG. 14 allows the piston 24, the insert 152 and the stop ring 156 to be assembled as an assembly into the turbine housing 4A. The disc spring 154 also acts as a seal to prevent gas leakage passing the volute area of the variable turbocharger apparatus 150, so that all the gases are used on the turbine wheel and thereby performance is improved.

Figure 15:
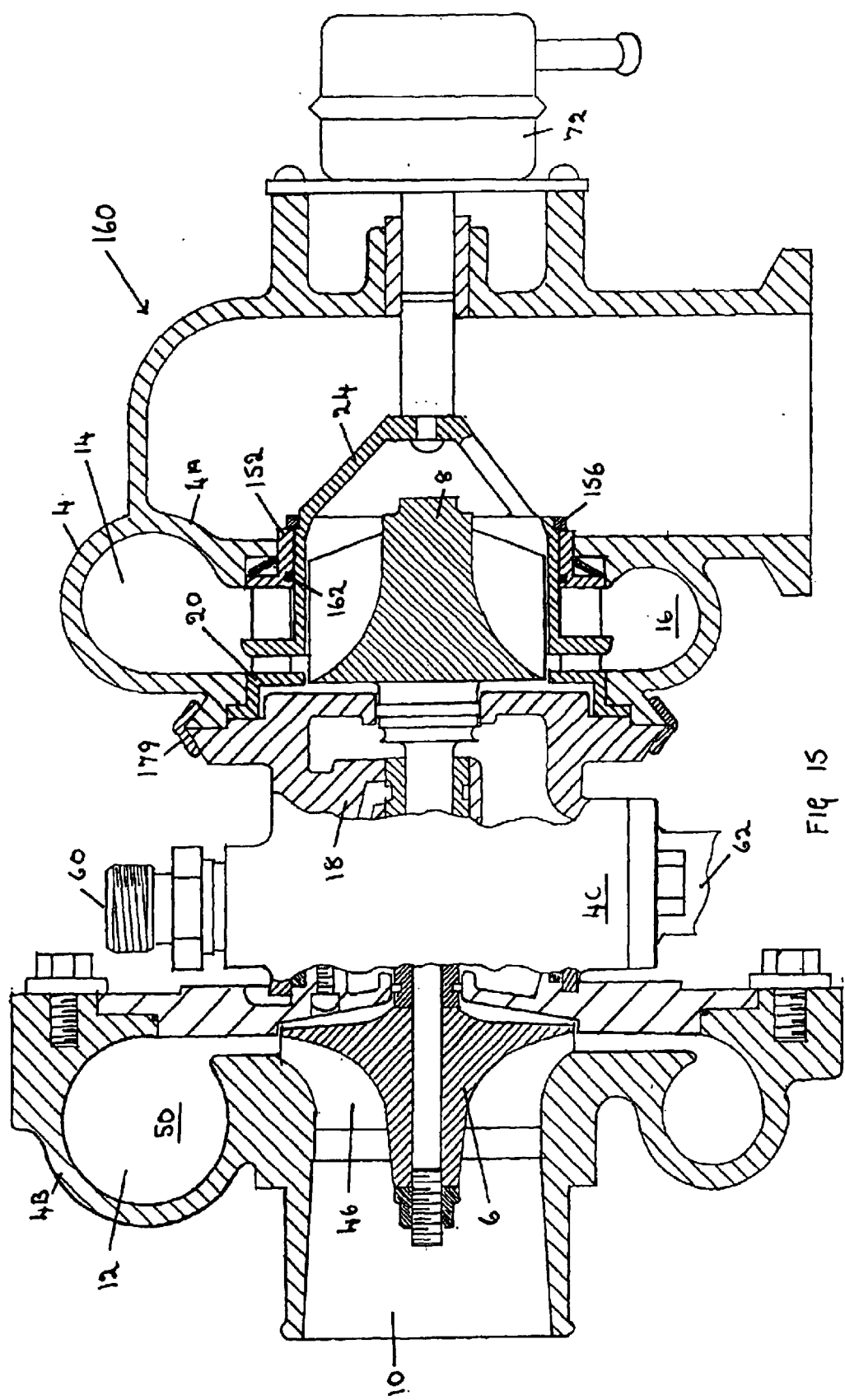
FIG. 15 is a section through seventh variable turbocharger apparatus of the present invention.

FIG. 15 shows variable turbocharger apparatus 160 which is like the variable turbocharger apparatus 150 shown in FIG. 14. In the variable turbocharger apparatus 160, the bearing assembly 18 has a heat shield 20 for helping to prevent heat build up in the bearing area. This particular design may be employed in variable turbocharger apparatus that is designed to run hotter than usual. FIG. 15 also shows the use of a seal 162 in the insert 152. The seal 162 is for preventing gas leakage when the piston 24 is in its open position.

As shown in both FIGS. 14 and 15, the stop ring 156 prevents all gas leakage passing the piston 24 when the piston 24 is in its closed position, since this is the most difficult part of the operating range of the turbocharger apparatus for being able to achieve good performance.

Figure 16:
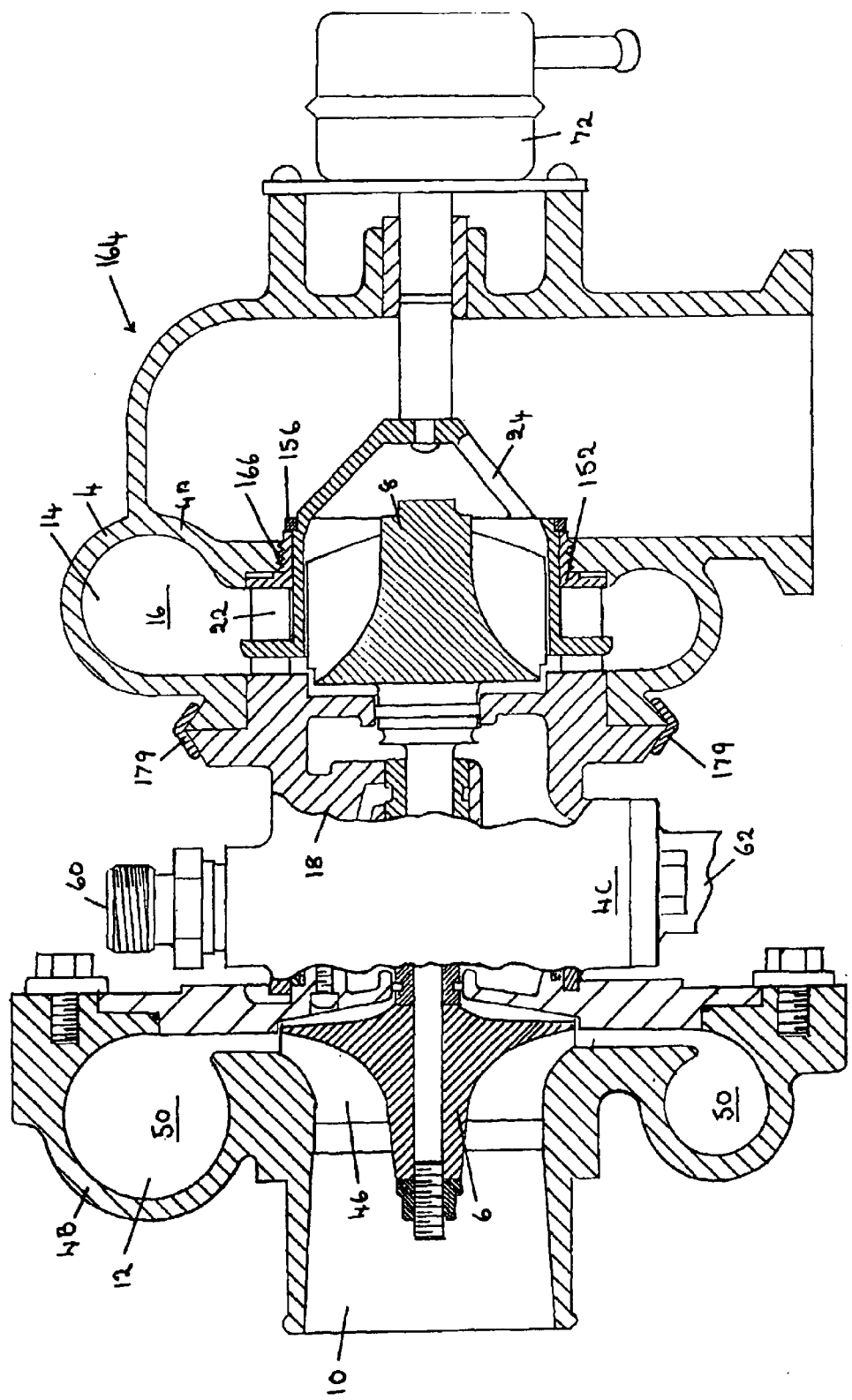
FIG. 16 is a section through eighth variable turbocharger apparatus of the present invention.

FIG. 16 shows variable turbocharger apparatus 164 which is like the variable turbocharger apparatus 150 and 160. As shown in FIG. 16, the variable turbocharger apparatus 164 has an insert 152 with the fixed vanes 22. However this insert 152 has screw threads 166 which allow the insert 152 to be screwed into the turbine housing 4. The screw threads 166 provide a sealing function, whilst at the same time allowing the insert 152 to be located in position in the turbine housing 4A. The use of the screw threads 166 also allows the assembly of the insert 152, the piston 24 and the stop ring 156 to be screwed into the turbine housing 4A as one single unit.

Figure 17:
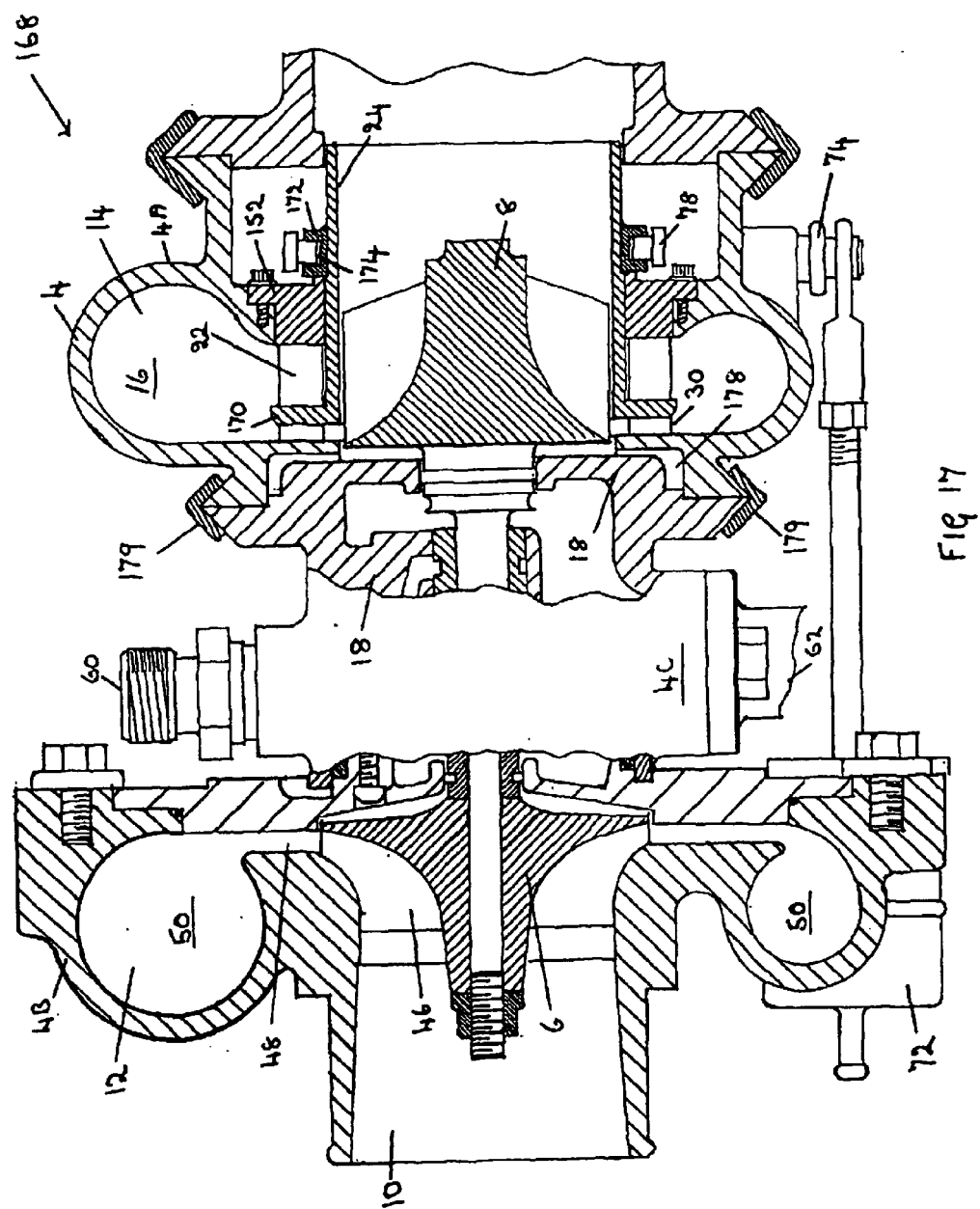
FIG. 17 is a section through ninth variable turbocharger apparatus of the present invention.

Referring now to FIG. 17, there is shown variable turbocharger apparatus 168 having an insert 152, vanes 22, a piston 24 and a flange 170. The piston 24 also has a stop ring 172 which is designed as shown with a groove 174. The stop ring 172 is used to allow a fork member 78 to be connected to the stop ring 172, and to move the piston 24 and the stop ring 172 in the variable turbocharger apparatus 168. The stop ring 172 sets the gap 30 when the piston 24 is in its closed position. When the actuator 72 moves the control rod 74, this in turn moves a fork 78 that controls the movement of the piston 24. The variable turbocharger apparatus 168 shown in FIG. 17 enables hot gases to be prevented from working on the fork member 78 and its associated parts by having a longer piston 24. As shown in FIG. 17, this longer piston 24 operates to shield the fork member 78 from the hot gases.

FIG. 17 also shows that the turbine housing 4 is machined to provide an air gap 178. The air gap 178 is positioned between the bearing assembly 18 and the turbine housing 4A. With this arrangement, a heat shield is not required because the turbine housing 4A also acts as a heat shield. The design of the variable turbocharger apparatus 168 shown in FIG. 17 also allows for the piston 24, the insert 152 and the stop ring 172 to be fitted into the turbine housing 4A as an assembly. FIG. 17 further shows the use of clamps 179 for clamping the turbine housing 4A to the bearing assembly 18.

Figure 18:
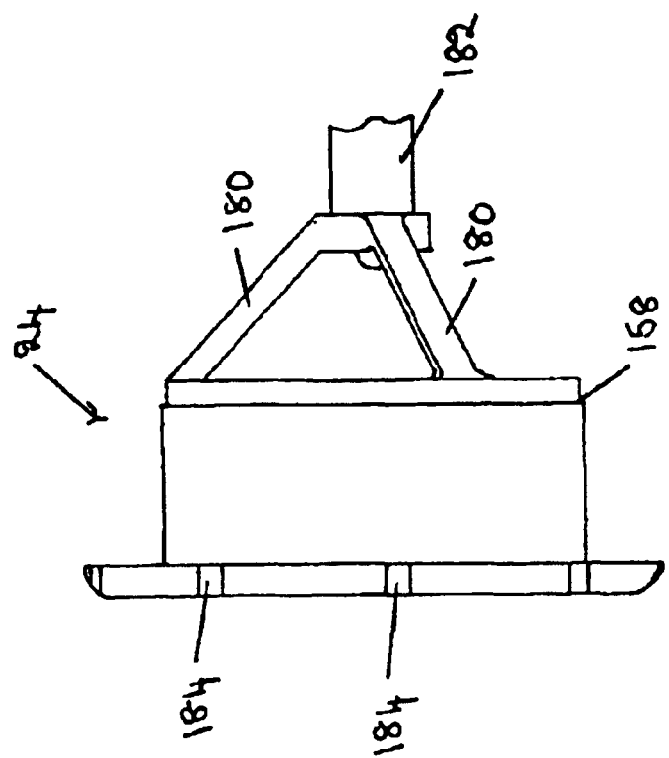
FIG. 18 is a side view of the piston used in the variable turbocharger apparatus shown in FIGS. 14–16.
Figure 19:
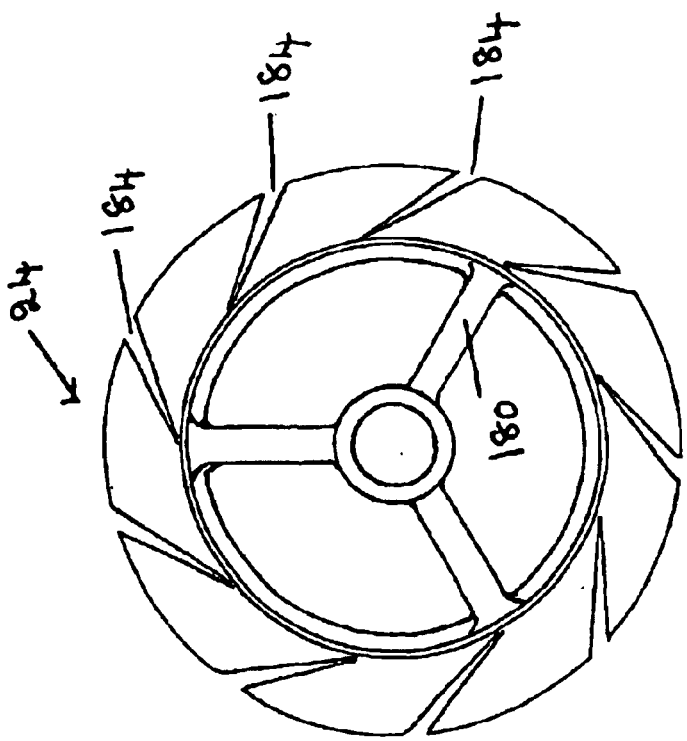
FIG. 19 is an end view of the piston as shown in FIG. 18.

FIGS. 18 and 19 show the piston 24 used in the variable turbocharger apparatus shown in FIGS. 14, 15 and 16. As can be seen from FIG. 18, there are arms 180 that hold the control rod 182 that connects to the actuator that moves the piston 24. Also shown in FIG. 18 is the step 158 for the stop ring 156 so that when the stop ring 156 is set against the step 158 and appropriately fixed in position, for example by welding or crimping, gas leakage is stopped when the piston 24 is in its closed position. Also this piston 24 may be stamped or formed as a single unit so the piston and flange are made as one part.

FIG. 19 best illustrates how the slots 184 for the vanes 22 are open ended slots. With variable turbocharger apparatus of the invention with a flange on the end of the piston, and with the vanes going through the slots in the flange, the performance of the variable turbocharger apparatus may be greatly increased. Also, the flange keeps the vanes clean when moving along the vanes. The vanes and the slots prevent rotation of the piston. Where the variable turbocharger apparatus of the present invention employs an insert, then insert with the vanes is utilised for guiding gases to the turbine wheel. The insert allows for the piston to work inside the bore of the insert between the vanes and turbine wheel. The use of a removable insert which is removable from the turbine housing allows for assembly of the piston into the turbine housing of the variable turbocharger apparatus. The variable turbocharger apparatus may be unique in its use of a spring to hold the insert and prevent gas leakage, in its use of an insert that is screwed into the turbine housing and that allows the piston assembly to be assembled as a unit in the turbine housing, in the use of an insert that is removable in order to allow part of a piston assembly to seal against the insert to prevent gas leakage, and in the use of an insert that is removable and which allows part of a piston assembly to locate on a side of the insert so as to set the gap of the end of the piston over the turbine wheel.

The different variations of the variable turbocharger apparatus of the present invention and shown in the accompanying drawings are able to work efficiently and to be manufactured economically. The gap 30 is able to be varied by the sliding piston 24. The flange on the end of the piston forms a control ring that slides over the vanes. By using the flange, the exhaust gases are guided more accurately through the vanes onto the turbine. Thus, the performance of the variable turbocharger apparatus is enhanced. Pressure on the back face of the flange helps to keep the piston in a closed position, so that a smaller sized control means may be used. Gas leakage through the slots where the vanes are located is not a problem with the variable turbocharger apparatus of the present invention because gas pressure is the same both sides of the control ring. During use of the variable turbocharger apparatus, if a carbon deposit builds up on the vanes, then this is cleaned off as the flange of the piston moves backwards and forwards over the vanes, with the vanes passing through the slots in the flange. Gas leakage is prevented when the piston is in its closed position. When the piston is in its closed position, this is the most vulnerable time for gas leakage. However, with the variable turbocharger apparatus of the present invention, all the gases are guided accurately through the vanes, the heat shield and the flange in order to work on the turbine as required.

It is to be appreciated that the embodiments of the invention described above with reference to the accompanying drawings have been given by way of example only and that modifications may be effected. Thus, for example, the shape of the chambers 16 and 50 may be varied. Also, the number of vanes may vary, and the sealing rings may be used or not used as may be desired.

What is claimed is:

1. Variable turbocharger apparatus comprising a housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds the turbine and which receives the exhaust gases from the second inlet before the exhaust gases are conducted to the turbine, and a bearing assembly for permitting the rotation of the turbine, the variable turbocharger apparatus comprising fixed vanes which are mounted in the chamber and which are for accurately directing exhaust gases on to the turbine, a piston which is slidable and which is positioned between the vanes and the turbine, and control means which is connected to the piston and which is for controlling the sliding movement of the piston, the piston having an end which is nearest the bearing assembly and which defines a gap, the size of the gap being variable in dependence upon the sliding of the piston under the control of the control means, the size of the gap being effective to control the amount of the exhaust gases that act on the turbine thereby controlling the speed of rotation of the turbine and thereby the amount of air conducted by the compressor through the outlet to the engine, and the end of the piston being such that it has a flange which extends radially outwardly and which is provided with slots for receiving the vanes.

2. Variable turbocharger apparatus according to claim 1 in which the vanes are mounted on a part of the housing which is adjacent the bearing assembly and which defines an exit from a chamber.

3. Variable turbocharger apparatus according to claim 1 in which the control means includes a fork member, which is connected to the piston on two opposed sides.

4. Variable turbocharger apparatus according to claim 1 in which the control means includes a U-shaped member which is connected to a face of the piston.

5. Variable turbocharger apparatus according to claim 1 in which the slots are open slots which extend inwardly from the periphery of the flange, or closed slots in the flange.

6. Variable turbocharger apparatus according to claim 1 in which the control means is an electronic control means which operates as part of an engine management control system.

7. Variable turbocharger apparatus according to claim 1 in which the chamber is a volute.

8. Variable turbocharger apparatus according to claim 1 and including a heat shield for shielding the bearing assembly from heat from the exhaust gases.

9. Variable turbocharger apparatus according to claim 8 in which the heat shield is a ring-shaped heat shield.

10. Variable turbocharger apparatus according to claim 8 in which the heat shield is a disc shaped heat shield having an outer ring portion, an inner wall portion, and an aperture through the inner wall portion.

11. Variable turbocharger apparatus according to claim 8 in which the vanes are mounted on the heat shield.

12. Variable turbocharger apparatus according to claim 1 in which the piston has a first abutment for forming a seal against a mating surface thereby to prevent loss of the exhaust gases between the abutment and the mating surface.

13. Variable turbocharger apparatus according to claim 12 in which the mating surface is a mating surface on a part of the housing.

14. Variable turbocharger apparatus according to claim 12 in which the mating surface is a mating surface on an insert in a part of the housing.

15. Variable turbocharger apparatus according to claim 12 in which the piston has a second abutment for engaging against the end of the vanes, thereby setting the gap when the piston is in its closed position.

16. Variable turbocharger apparatus according to claim 12 including a sealing ring for forming an auxiliary seal for preventing loss of any of the exhaust gases that pass between the first abutment and the mating surface.

17. Variable turbocharger apparatus according to claim 1 and including an insert located in the housing, and in which the vanes are mounted on the insert.

18. Variable turbocharger apparatus according to claim 17 in which the insert is a non-removable insert which is not removable from the housing.

19. Variable turbocharger apparatus according to claim 17 in which the insert is a removable insert which is removable from the housing, the removable insert being such that it facilitates assembly of the variable turbocharger apparatus.

20. Variable turbocharger apparatus according to claim 19 in which the piston passes through a bore in the insert.

21. Variable turbocharger apparatus according to claim 19 in which the insert is held in position by a spring.

22. Variable turbocharger apparatus according to claim 21 in which the spring is such that it forms a seal for preventing gas leakage from the chamber which surrounds the turbine.

23. Variable turbocharger apparatus comprising a housing, a compressor mounted for rotation in the housing, a turbine mounted for rotation in the housing, an insert located in the housing, the insert being a removable insert which is removable from the housing, the removable insert being such that it facilitates assembly of the variable turbocharger apparatus, and the turbocharger apparatus including a spring for holding the insert in position, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds the turbine and which receives the exhaust gases from the second inlet before the exhaust gases are conducted to the turbine, and a bearing assembly for permitting the rotation of the turbine, the variable turbocharger apparatus comprising fixed vanes which are mounted in the chamber and which are for accurately directing exhaust gases on to the turbine, a piston which is slidable and which is positioned between the vanes and the turbine, and control means which is connected to the piston and which is for controlling the sliding movement of the piston, the piston having an end which is nearest the bearing assembly and which defines a gap, the size of the gap being variable in dependence upon the sliding of the piston under the control of the control means, and the size of the gap being effective to control the amount of the exhaust gases that act on the turbine thereby controlling the speed of rotation of the turbine and thereby the amount of air conducted by the compressor through the outlet to the engine.

24. Variable turbocharger apparatus according to claim 23 in which the spring is such that it forms a seal for preventing gas leakage from the chamber which surrounds the turbine.

* * * * *